United States Patent Office 3,410,794
Patented Nov. 12, 1968

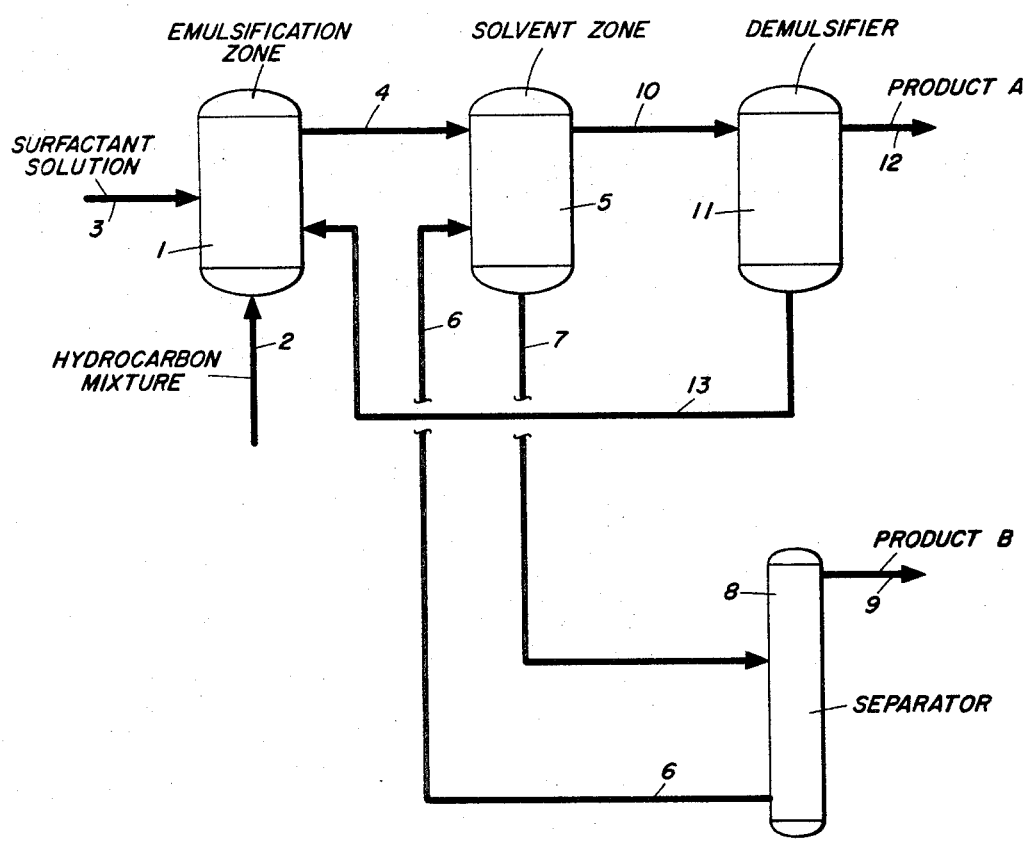

3,410,794
SEPARATING HYDROCARBONS WITH LIQUID MEMBRANES
Norman N. Li, Somerset, N.J., assignor to Esso Research and Engineering Company, a corporation of Delaware
Filed Mar. 14, 1966, Ser. No. 533,933
13 Claims. (Cl. 208—308)

ABSTRACT OF THE DISCLOSURE

A process for separating mixtures into their component parts by means of selective permeation through liquid (surfactant) membranes. The mixture to be separated is first emulsified in aqueous medium containing a selected surfactant. The emulsified mixture droplets which are coated with surfactant are then contacted with a selected solvent. The more permeable component(s) of the mixture permeate the membrane coating and pass into the solvent phase. The less permeable component(s) remain in the droplets in the emulsion phase. The separated components are then separated from the respective phases by conventional means.

---

This case pertains to a method for separating materials which are in admixture. More particularly, this case pertains to a method for separating mixtures wherein one member of the mixture is a hydrocarbon. In a preferred form of this invention all members of the mixture are hydrocarbons, and the hydrocarbons to be separated are similar to one another in physical and/or chemical properties so that traditional methods of separation have been ineffective in separating them. The separation of these similar hydrocarbons is achieved by means of selective permeation through liquid membranes which are formed by molecules of surfactant and water. However, in order to facilitate maximum recovery an emulsion must be formed of the hydrocarbon mixture to be separated through the liquid surfactant membranes.

This emulsion may be formed of surfactant-coated droplets of the mixture to be separated or an emulsion of the mixture may be first formed and surfactant subsequently coated around the droplets within the emulsion.

The problems associated with separating materials which have similar physical and chemical properties have been well-known in the art for a considerable length of time. Often these materials are hydrocarbons which have similar boiling points but substantially different characteristics such as iso and normal paraffins having the same number of carbon atoms. A similar problem is encountered when separating aromatic hydrocarbons and normal paraffins which have the same or a similar number of carbon atoms such as for instance benzene and hexane. In addition, certain mixtures of compounds which may contain at least one organic compound or hydrocarbon when distilled produce vapors that have the same composition as the liquid mixture. These particular mixtures are called azeotropic mixtures. Since there was a constant boiling point, the individual components of the mixture cannot be separated by ordinary distillation. Azeotropic distillation wherein a third component is added to produce other azeotropic mixtures which are separable has been employed. However, the third component must be carefully selected so that the new azeotropes formed can be resolved by stratification, solvent extraction followed by distillation or distillation alone when used under vacuum. The disadvantages of such a situation are obvious; it is expensive and often separations have not been as complete as would be desired.

For a long period of time it has been known to make use of solid membranes to effect difficult separations. These membranes are somewhat effective but have presented many substantial drawbacks. A more advanced modification of the use of solid membranes concerns the use of membranes which are composed of polymeric plastic films. These films are thinner than the traditionally utilized membranes and operate on a different principle. One of the components of any mixture to be separated must be soluble enough in the polymer to allow for permeation without softening the film because of the real danger of film rupturing.

In copending application Ser. No. 537,580, filed Jan. 20, 1966, the disclosure of which is hereby incorporated in its entirety by reference, the problems of the prior art membranes were basically solved. In this application it was discovered that the separation of materials, especially hydrocarbons, which may be quite similar in their physical and/or chemical properties can be achieved by selective permeation through liquid membranes formed by aqueous solutions of surfactant molecules. Surfactants are surface active agents having hydrophobic and hydrophilic ends. Although the use of liquid surfactant membranes represents a significant improvement over the prior art, this process was still faced with problems. The previous use of liquid surfactant membranes resulted in some drop break up in the solvent phase. This could be avoided by increasing the membrane thickness but this in turn would cut down on mass transfer. The formation of an emulsion of the surfactant coated droplets of the mixture to be separated cuts down on the drop break up since the size of the droplets in the mixture to be separated is reduced. Reduction of drop size leads directly to a decrease of surface force responsible for membrane rupture. This results in an increase of drop stability.

In addition, the rate of mass transfer is increased by utilizing a pressure gradient. Emulsion droplets which range in size from $1 \times 10^{-7}$ cm. to $1 \times 10^{-2}$ cm. possess high internal pressure as a result of large curvature effect. It can be shown that the difference between the internal and external pressures is equal to twice the ratio of surface tension to drop radius. Therefore, in the presence of surface forces, a decrease in drop size results directly in an increase of the internal and external pressure difference. (Ref. Surface Chemistry by L. I. Osipow, p. 11, Reinhold Publishing Corporation, New York (1962).)

Finally, the total large surface presented by these small droplets result in extremely efficient mass transfer. Reducing the drop radius by half doubles the total surface area. In fact the permeation rate of the more permeable component of a given mixture increases about 20 to 50 times over the use of liquid surfactant membranes without the emulsion technique of the instant invention.

The general advantages to be gained by the use of liquid membrane films over the solid polymeric films used in the past are numerous. Film life is extremely critical in selecting polymeric membranes whereas the problem does not exist in liquid membranes. Unlike its solid state counterpart, the liquid membrane is homogenous in composition and is free of pinholes as a result of surface tension effect. Additionally, the solid membrane requires mechanical support; a liquid surfactant membrane would not need a support.

The thinnest solid polymeric membrane which may be reasonably utilized is about $10^{-4}$ inches thick. Whereas for a liquid membrane, which can be a single molecular layer, the thickness may be in the order of $10^{-7}$ inches. Since permeation rate is inversely proportional to the film thickness, the use of a thinner membrane results in a far higher permeation rate.

Mass transfer rates per volume of equipment are also considerably higher because droplets have more interfacial area. The key to a successful permeation operation is the rate at which the liquid diffuses through the membrane utilized. If the rate is slow, the process becomes too time consuming and is, therefore, ineffective. The instant process, which combines the numerous advantages outlined above associated with the use of liquid surfactant membranes, with the additional advantages of the emulsifying of the surfactant coated droplets of the mixture to be separated, results in an extremely efficient separation process.

In more detail, the process of the instant invention concerns the discovery that if one is desirous of separating mixtures by means of selective permeation through liquid membranes formed by surfactant molecules, the results of the separation can be greatly enhanced by emulsifying the droplets of the mixture before or after they are coated with a liquid surfactant membrane. The emulsified droplets have a diameter of $10^{-7}$ cm. to $10^{-2}$ cm., preferably $10^{-6}$ cm. to $10^{-4}$ cm. The emulsification of the droplets may take place in any well-known manner. Since the surfactant has already been added to the mixture which is to be separated, forming the emulsion is relatively easy. Perhaps the most common method for forming such an emulsion is by high speed mechanical agitation. If a beater is to be used, speeds of 300 r.p.m. or higher can be used to form the emulsion. Other well-known techniques which may be utilized include the use of colloid mills in which large droplets are broken up by the intense shearing forces. Homogenizers can also be used after a preliminary emulsification in a mixing vessel, colloid mill, or other device. In this type of operation, the coarse emulsion is pumped at a high velocity through the annular opening of a valve. The droplets are disrupted, partly by the simple "sieving action" and partly by the intense shearing forces which are set up in the annulus. Other emulsifying devices resemble the intense types just described, such as special mixing pumps, centrifugal emulsifiers, ultrasonic generators, slotted mixers, mixing jets including those in which ultrasonic vibration occurs and turbulent flow devices in which a coarse emulsion is made to flow along a tube at a speed greater than the critical velocity for turbulence.

The emulsified droplets of mixture, which are surfactant coated, are then washed with a solvent phase. The more permeable member or members of the mixture, those which pass more readily through the surfactant membrane, pass into the solvent phase and are therein washed away. The less permeable member or members of the mixture are passed while still in the emulsion phase to a demulsification zone, which may be an electrostatic coalescer. When the emulsion is broken, the less permeable compound may be separated along with a small amount of the more permeable compound, from the aqueous surfactant solution. Since the hydrocarbons and the aqueous solution of surfactants have quite different densities, they form two distinct layers in the demulsifier. The top layer, usually the hydrocarbons can be taken out as product or sent to another stage for further processing. The bottom layer, usually the aqueous solution of surfactants, can be sent to the emulsifier for reuse. The more permeable compound is removed along with the solvent and the solvent may be separated from the more permeable compound by conventional means such as distillation.

Any of the various water soluble surfactants may be utilized but for a desired separation, a tailor made surfactant may be necessary to achieve maximum results. The hydrophobic part of the surfactant molecule should be as similar to the permeate molecule in structure as possible. In separating hydrocarbons based on a difference of molecular polarity, ionic surfactants are preferred. Normal paraffins may be separated from olefins in this manner since the double bond makes the olefin more polar. An ionic surfactant which dissociates in liquid such as saponin should be utilized. The olefin is attracted and tends to diffuse through the surfactant membrane more readily than the paraffin. All surfactant membranes utilized will be used in aqueous solution so they must be water soluble.

A wide variety of different surfactant groups may be utilized for the process of the instant invention. The various surfactant groups include anionic surfactants, cationic surfactants, nonionic surfactants, amphoteric surfactants and miscellaneous surfactants such as polymeric surfactants and fluorocarbon surfactants. All may be utilized in the process of the instant invention. Atlhough for a given separation, one group may achieve greatly enhanced separation. The preferred grouping of surfactant to be utilized in the instant invention are the cationic surfactants and anionic surfactants since they are ionizable and the presence of a charge aids the instant invention.

Anionic and cationic surfactants both ionize in solution. Anionic surfactants ionize in solutions and produce a negative charge. By contrast, cationic surfactants ionize in solution and produce a positive charge. The general classification of nonionic surfactants refers to those surfactants which do not ionize in solution at all. The various amphoteric or ampholitic surfactants ionize in solution and produce either a positive or negative charge depending on the pH of the solution.

Anionic surfactants include a wide range of compounds. Perhaps the best known of which are the soaps which are water soluble salts of long-chain carboxylic acids. The soaps usually contain 12 to 18 carbon atoms per molecule and may be prepared from saturated or unsaturated fatty acids. Generally, the soaps are salts of sodium, potassium or ammonia. Included among them are the aliphatic sulfonates which are represented by the general formula: $R \cdot SO_2 \cdot O^-, Na+$ in which R may be a straight-chain or branched-chain paraffin chain, or a cyclo-aliphatic radical. An example of this group would be sodium tetradecane sulfonate. Additionally, the group includes sulfonates of aliphatic-aromatic hydrocarbons such as alkylated naphthylene, alkylated benzene, and aralkyl aromatics. The alkyl benzene sulfonate type of detergent has received wide use in industry. When utilizing benzene as the aromatic constituent of the surface active agent, it has been found that best results can be achieved if one of the alkyl groups is $C_{10}$ to $C_{14}$ in length. Other surface-active agents included in this general group are ester sulfonates such as sulfoester and sulfoacyl compounds, amide sulfonates such as sulfoamide and sulfoacyl amide compounds and sulfoamide sulfonates. Additionally, sulfonates containing ether, amino, keto and sulfone groups may be utilized.

The anionic surface-active agents also include the class of aliphatic sulfates which is characterized by the generic formula of $R(OSO_3^-, Na+)_n$ wherein R contains one or more hydrophobic groups and $n$ is at least one. Traditionally, R is a saturated or unsaturated aliphatic group, branched or with a straight chain usually containing 12 carbon atoms. Shorter chains may be utilized. The group contains sulfated fatty alcohols such as straight-chain, secondary, tertiary and branched-chain fatty alcohol sulfates. Additionally, sulfated fatty condensation products, sulfated fatty glycerides, acids and esters as well as sulfonated oils may be used.

The general group of cationic surfactants includes amine salts as well as quaternary ammonium compounds. Salts of long-chain primary alkyl amines including octadecylamine and dodecylamine are effective surfactants in this group. However, the secondary, tertiary amine salts and quaternary ammonium salts are preferable. Amine salts having at least one alkyl group of $C_8$ to $C_{20}$ are effective surfactants.

The nonionic surfactants also represent a wide grouping. Included within this group are the sugar esters as exemplified by the fatty esters of glycol, sorbitol and mannitol. The fatty alcohol amides also fall within this category. Additionally, derivatives of ethylene oxide such as the Igepals are also nonionic surfactants. The Igepals are discussed in more detail below.

The final overall grouping can best be called miscellaneous and includes a broad category of macromolecules and polymers. Included within this group are the polyvinyl alcohols and derivatives thereof such as aldehydes derived from various polyvinyl alcohols. Polyvinyl esters are also effective as surface-active agents.

Since the number of surfactants is extremely large, it is not intended to burden this application with numerous examples. The following publications are herein incorporated by reference. Surface Chemistry by Lloyd I. Osipow, Reinhold Publishing Company, New York (1962), Chapter 8 and Surface Activity, Moilliet et al., Van Nostrand Company, Inc. (1961), Part III.

Typical surfactants that may be utilized with this invention include Igepal. This is a nonionic surfactant, nonylphenoxypolyethyleneoxy ethanol. It is a trademark of the General Aniline and Film Corporation and has the configuration $RC_6H_4O(CH_2CH_2O)_nCH_2CH_2OH$ where R may be $C_8H_{17}$, $C_9H_{19}$ or $C_{10}H_{21}$ and $n$ varies from 1.5 to 100. Other surfactants include polyvinyl alcohol, a surface-active macromolecule; trimethyldodecyl ammonium chloride, an effective cationic quaternary ammonium surfactant; sodium dodecyl sulfate, an effective surfactant of anionic aliphatic sulfate.

Saponin, another surface-active agent in the group of anionic surfactants, is better known as sapogeninglycoside. It is a type of glycoside which is widely distributed in plants. All saponins foam strongly when shaken with water. They form oil in water emulsions and act as protective colloids. Each saponin molecule consists of a sapogenin which constitutes the aglucon moiety of a molecule and a sugar. The sapogenin may be a stearoid or a triturpene and a sugar moiety may be glucose, galactose, pentose or a methyl pentose. Saponin has been hypothesized according to Hackh's Chemical Dictionary by Julius Grant, Third Edition, 1944 (McGraw-Hill Book Company, Inc.), as having a formula $C_{32}H_{54}O_{18}$ and a molecular weight of 726.5.

Surfactant solution along with a suitable mixture to be separated, i.e., olefins and paraffins, is placed into a containing zone. Within this zone, the mixture is emulsified. This may be done in any of several ways such as by high speed stirrers, colloid mills, valve homogenizers, ultrasonic generators, or mixing jets. The mixture can be emulsified prior to the addition of the surfactant but it is preferred to add the surfactant and then emulsify the mixture. The preferred method of obtaining an emulsion is mixing the surfactant solution and the hydrocarbon mixture for about 1 to 5 minutes at speeds of 300 r.p.m. or higher. The surfactant coats the droplets of the hydrocarbon mixture within the emulsion. These droplets are about $1 \times 10^{-7}$ to $1 \times 10^{-2}$ cm. in diameter. The emulsion is next passed into a permeation zone. Within the zone, the surfactant coated droplets are gently washed with solvent. The more permeable member or members of the mixture passes out into the solvent phase. The solvent phase which is rich in the more permeable member of the mixture is then passed out of the permeation zone. The solvent phase is selected so that all members of the mixture are miscible to some degree with this phase. The miscibility is preferred to be substantially similar for all the components of the mixture since in this manner the separation is dependent on permeability through the surfactant membrane rather than a solvent extraction process. The solvent phase itself is preferably organic in nature. Among the more effective solvents that may be utilized for washing the emulsion and separating the more permeable member of the hydrocarbon mixture are kerosene and Solvent 100 Neutral which is a heavy paraffin oil.

As another alternative, multi-stages may be used to achieve additional enrichment in the nonpermeating compound or compounds. It would be apparent that using several stages of permeation a very fine separation could be made of almost any mixture no matter how close the relative rates of permeation are of the components of the mixture. Thus, after an initial separation the more permeable member or members of the mixture are separated from the solvent phase and may be recycled back to the original emulsion zone to be once again contacted with liquid surfactant and a new emulsion formed. In the same manner after the emulsion has been broken the mixture rich in less permeable compound or compounds may be recycled back to the emulsion zone and treated again. This may continue as frequently as desired in order to produce substantially pure compounds.

The scope of this invention is extremely broad. It can be utilized to separate substantially all mixtures into their component parts. This would include inorganic mixtures such as the separation of salt from sea water. The invention would also include separation of salt from any mixture whether organic or inorganic. This can be of extremely great importance in producing palatable drinking water from salt water. Additionally, the removal of salt from other solutions aids in preventing corrosion. However, the invention is primarily concerned with the separation of mixtures where all components are hydrocarbons or where at least one component is a hydrocarbon.

It should be emphasized that nonionic and ionic surfactant membranes may be used interchangeably for all separations. The use of ionic surfactants is preferred when there are polar molecules in the mixture to be separated. This preference is based on the fact that the polar molecules are attracted to the ionic membrane and this increases the permeation rate.

This invention would also include the use of nonionic surfactant membranes for the separation of isoparaffins from naphthenes or normal paraffins from naphthenes as would be the case in the separation of normal hexane from cyclohexane. Additionally, aromatics can be separated from paraffins as in the separation of normal hexane from benzene or toluene from normal or isoheptane. These separations would operate more efficiently with ionic surfactant membranes since there are polar compounds to be separated from the nonpolar paraffins. The separation of azeotropic mixtures such as hexane and cyclohexane, benzene and cyclohexane, isopentane and methylbutene can also be effected.

Additional separations that can be effected include the following. Separation of benzene from steam-cracked naphtha, separation of petroleum fractions for recovering aromatics, hydrocarbon isomers or for improving octane number of gasoline boiling-range fractions and separation of azeotropes and close-boiling mixtures of water and oxygenated hydrocarbons such as alcohols, ketones, ethers, aldehydes and acid. Perhaps the most effective separation is that of diolefins from aromatics and paraffins; dolefins permeate far more rapidly. It is especially preferred to utilize ionic surfactants for this separation.

With respect to the permeability of various mixtures, the following general rules may be stated; it should be noted that there are exceptions to these rules and they are intended only as a guide. The permeation of the more volatile component will usually be favored. With mixtures of molecules differing only in the extent of unsaturation, permeation of the more unsaturated will be favored. For a given molecular weight, permeation of the molecule smaller in size will be favored. On occasion a lighter molecule may be more bulky and therefore permeate less rapidly.

The following theory is offered for the operation of the instant invention; there is no intent to be bound by any particular mechanism. The process of permeation of fluids through a liquid membrane may be composed of three independent steps. Initially, a solution of the permeating molecules may be formed on the inside face of the liquid membrane. Next, the molecules diffuse through the membrane. Finally, the molecules must be desorbed from the outside face of the membrane. Thus, among the factors which will effect the diffusion through a liquid membrane are the membrane permeate compatibility, activity gradient and membrane hole size.

A wide range of temperatures may be utilized in the process of the instant invention. Temperatures used in the separation process itself are not critical. There would, however, be a lower and an upper limit which would be satisfactory for separation with a liquid phase surfactant membrane. The lowest temperature should be higher than the freezing temperature of the aqueous surfactant solution. It will also have to be higher than the freezing temperature of the surfactant or of the hydrocarbon mixture so that mass transfer will be facilitated.

In the event that nonionic surfactants are utilized, the highest temperature should be lower than the precipitation temperature of the surfactant. If an ionic surfactant is to be used, the highest temperature is restricted by the boiling point of the aqueous surfactant solution. Of course, the temperature will have to be lower than the boiling point of the hydrocarbon mixture or the solvent. Thus, the temperature is to be regulated by the boiling point of the lowest boiling element in the separation. It would be preferred to use room temperature since there is no additional expense in obtaining this level.

Pressure is also not critical and the most desirable pressure would be ambient, i.e., one atmosphere. Sufficient pressure will be needed to maintain all the elements of the separation, i.e., surfactant, solvent and hydrocarbon mixtures, in liquid phase.

The amount of surfactant to be added to the mixture which is to be separated may also vary within wide ranges. $10^{-4}$ to $10^{-1}$ moles of surfactant may be added per liter of water, preferably $10^{-2}$ to $10^{-1}$ moles of surfactant per liter of water. It should be emphasized that liquid membranes are utilized for the separation of liquid phase mixtures. The solvent phase must be miscible with the mixture to be separated. This process may also be utilized to separate mixtures of gases.

The attached figure represents a schematic view of the separation scheme of the instant invention.

Turning to the figure, a mixture containing two components of similar boiling points and different configurations such as normal heptane and toluene is introduced into emulsion zone 1 through line 2. A surfactant which in this case would be saponin is introduced into the emulsion zone 1 through line 3. About 0.01 gm. to 0.1 gm. of surfactant is added to the zone per mole of mixture to be separated. Within zone 1 an emulsion is formed by mixing the surfactant and hydrocarbon mixture together at high speeds, speeds of 300 r.p.m. or higher may be utilized. The surfactant coats the individual mixture droplets with a liquid coating. The liquid coated droplets having a maximum diameter roughly of 0.01 cm. are passed through line 4 into solvent zone 5. Within this zone the mixture is gently washed with solvent. Solvent is passed into the solvent zone 5 through line 6. The washing of emulsion with solvent is accomplished by mixing the emulsion and solvent at low speed; speeds of 10 to 100 r.p.m. may be utilized. In this case, the solvent is kerosene. The washing period takes from 1 to 5 minutes. It is conducted at a temperature of 70° to 80° F. and ambient pressures. The solvent, along with the more permeable component which in this case is toluene, passes out from solvent zone 5 through line 7 into separator zone 8 where the solvent is separated from the more permeable component. The solvent is separated within separator 8 which in this case is a frictionator. The solvent is recycled if desired through line 6 back into solvent zone 5. The product is removed through line 9. There will of course be a minor amount of the less permeable compound present but this may be substantially removed by recycling.

An emulsion of surfactant and less permeable compound, with some of the more permeable compounds still included, is removed through line 10 from zone 5 and passed to demulsifying zone 11. The demulsifying zone may contain an electrostatic precipitator but any of the well-known methods for breaking an emulsion may be utilized. Once the emulsion is broken, the aqueous solution of surfactant and the less permeable compound may be readily separated. The less permeable compound is removed through line 12 and the aqueous solution of surfactant is recycled through line 13 back to emulsification zone 1. The hydrocarbon mixture is fed into emulsification zone 1 at a rate of 100 to 1000 cc. per minute. Permeation rates using of the process of the instant invention will vary between 100 and 1000 gallons per hour per thousand square feet of membrane surface.

Example 1

In this example a process sequence similar to that of the figure was utilized. A mixture of heptane and toluene was introduced into emulsification zone 1 through line 2. A surfactant which was saponin was introduced into zone 1 through line 3. About 250 gm. of mixture were used and about 350 cc. of 0.5% by weight of surfactant solution was added through line 3. The surfactant and hydrocarbon mixture were emulsified by means of stirring. Hydrocarbon mixture was placed in the emulsifier first, then the stirrer was turned on with a speed of 300 r.p.m. The aqueous solution of surfactant was then introduced gradually into the emulsifier. As a result droplets of 0.01 cm. and smaller diameter were formed coated with surfactant. Temperature for this mixing operation was 80° F. and pressure was 1 atm. The mixture originally comprised a ratio of 50.0% by weight of heptane and 50.0% by weight of toluene. After the emulsion was formed, the emulsified mixture was passed through line 4 into solvent zone 5. Here the mixture was gently washed with a solvent which was Solvent 100 Neutral. The washing was done in the form of mixing the mixture with the solvent at low mixing speed. A speed of 60 r.p.m. was employed. About 500 cc. of solvent were needed to wash the emulsion. The solvent was passed over the emulsion for a period of about 5 to 10 minutes. The compound which permeates more readily, toluene, was passed out of solvent zone 5 along with the solvent through line 7 and passed into fractionator 8. Here the solvent was separated and recycled through line 6. Product was obtained through line 9 which contained 25.8% by weight of heptane, and 74.2% by weight of toluene. The emulsion was removed from solvent zone 5 through line 10. The emulsion was rich in the less readily permeating compound which was heptane. The emulsion was then passed into electrostatic coalescer zone 11 and the emulsion was broken. Surfactant was removed through line 13 and recycled back into emulsion zone 1. Product was removed through line 12. This product contained 65.2% by weight of heptane and 34.7% by weight of toluene.

Example 2

In this example a process sequence similar to that of the figure was again utilized. A mixture of heptane and toluene was introduced into emulsification zone 1 through line 2. A surfactant which was saponin was introduced into zone 1 through line 3. About 250 gm. of mixture were used and about 270 cc. of 0.5% by weight of surfactant was added through line 3. The surfactant and hydrocarbon mixture were emulsified by means of stirring. Hydrocarbon mixture was placed in the emulsifier first, then the stirrer was turned on with a speed of 300 r.p.m. The aqueous solution of surfactant was sent into the emulsifier. As a result droplets of 0.01 cm. and smaller diameter were formed coated with surfactant. Temperature for this mixing operation was 80° F. and pressure was 1 atm. The mixture originally comprised a ratio of 50.0% by weight of heptane and 50.0% by weight of toluene. After the emulsion was formed, the emulsified mixture was passed through line 4 into solvent zone 5. Here the mixture gently washed with a solvent which was Solvent 100 Neutral. The washing was done in the form of mixing the mixture with the solvent at low mixing speed. A speed of 60 r.p.m. was employed. About 500 cc. of solvent were needed to wash the emulsion. The solvent was passed over the emulsion for a period of about 5 minutes. The compound which permeates more readily, toluene, was passed out of solvent zone 5 along with the solvent through line 7 and passed into fractionator 8. Here the solvent was separated and recycled through line 6. Product was obtained through line 9 which contained 26.3% by weight of heptane, and 73.7% by weight of toluene. The emulsion was removed from solvent zone 5 through line 10. The emulsion was rich in the less readily permeating compound which was heptane. The emulsion was then passed into electrostatic coalescer zone 11 and the emulsion was broken. Surfactant was removed through line 13 and recycled back into emulsion zone 1. Product was removed through line 12. This product contained 64.3% of heptane and 35.7% of toluene. This product was recycled once under the same experimental conditions. The enrichment of heptane in the product was enhanced. The composition was 84.2% heptane and 15.8% toluene.

Example 3

In this example a process sequence similar to that of the figure was again utilized. A mixture of heptane and toluene was introduced into emulsification zone 1 through line 2. A surfactant which was Igepal–880 was introduced into zone 1 through line 3. 250 gm. of mixture were used and about 270 cc. of 0.2% by weight of mixture of surfactant was added through line 3. The surfactant and hydrocarbon mixture were emulsified by means of stirring. Hydrocarbon mixture was placed in the emulsifier first, then the stirrer was turned on with a speed of 300 r.p.m. The aqueous solution of surfactant was sent into the emulsifier. As a result droplets of 0.01 cm. and smaller diameter were formed coated with surfactant. Temperature for this mixing operation was 80° F. and pressure was 1 atm. The mixture originally comprised a ratio of 50.0% by weight of heptane and 50.0% by weight of toluene. After the emulsion was formed, the emulsified mixture was passed through line 4 into solvent zone 5. Here the mixture was gently washed with a solvent which was Solvent 100 Neutral. The washing was done in the form of mixing the mixture with the solvent at low mixing speed. A speed of 60 r.p.m. was employed. About 500 cc. of solvent were needed to wash the emulsion. The solvent was passed over the emulsion for a period of about 5 minutes. The compound which permeates more readily, toluene, was passed out of solvent zone 5 along with the solvent through line 7 and passed into fractionator 8. Here the solvent was separated and recycled through line 6. Product was obtained through line 9 which contained 13.4% by weight of heptane, and 86.6% by weight of toluene. The emulsion was removed through solvent zone 5 through line 10. The emulsion was rich in the less readily permeating compound which was heptane. The emulsion was then passed into electrostatic coalescer zone 11 and the emulsion was broken. Surfactant was removed through line 13 and recycled back into emulsion zone 1. Product was removed through line 12. This product contained 70.5% of heptane and 29.5% of toluene.

Example 4

In this example a process sequence similar to that of the figure was again utilized. A mixture of heptane and toluene was introduced into emulsification zone 1 through line 2. A surfactant which was saponin was introduced into zone 1 through line 3. About 250 gm. of mixture were used and about 300 cc. of 0.5% by weight of mixture of surfactant was added through line 3. The surfactant and hydrocarbon mixture were emulsified by means of stirring. Hydrocarbon mixture was placed in the emulsifier first, then the stirrer was turned on with a speed of 300 r.p.m. The aqueous solution of surfactant was sent into the emulsifier. As a result droplets of 0.01 cm. and smaller diameter were formed coated with surfactant. Temperature for this mixing operation was 80° F. and pressure was 1 atm. The mixture originally comprised a ratio of 50.0% by weight of heptane and 50.0% by weight of toluene. After the emulsion was formed, the emulsified mixture was passed through line 4 into solvent zone 5. Here the mixture was gently washed with a solvent which was kerosene. The washing was done in the form of mixing the mixture with the solvent at low mixing speed. A speed of 60 r.p.m. was employed. About 500 cc. of solvent were needed to wash the emulsion. The solvent was passed over the emulsion for a period of about 5 minutes. The compound which permeates more readily, toluene, was passed out of solvent zone 5 along with the solvent through line 7 and passed into fractionator 8. Here the solvent was separated and recycled through line 6. Product was obtained through line 9 which contained 6.7% by weight of heptane, and 93.3% weight of toluene. The emulsion was removed through solvent zone 5 through line 10. The emulsion was rich in the less readily permeating compound which was heptane. The emulsion was then passed into electrostatic coalescer zone 11 and the emulsion was broken. Surfactant was removed through line 13 and recycled back into emulsion zone 1. Product was removed through line 12. This product contained 63.7% of heptane and 36.3% toluene.

Example 5

In this example a process sequence similar to that of the figure was also utilized. A mixture of octane and iso-octane (trimethyl pentane) was introduced into emulsification zone 1 through line 2. A surfactant which was Igepal–710 was introduced into zone 1 through line 3. About 310 gm. of mixture were used and about 350 cc. of 0.5% by weight of mixture of surfactant was added through line 3. The surfactant and hydrocarbon mixture were emulsified by means of stirring. Hydrocarbon mixture was placed in the emulsifier first, then the stirrer was turned on with a speed of 300 r.p.m. The aqueous solution of surfactant was then sent into the emulsifier. As a result droplets of 0.01 cm. and smaller diameter were formed coated with surfactant. Temperature for this mixing operation was 80° F. and pressure was 1 atm. The mixture originally comprised a ratio of 49.7% by weight of octane and 50.3% by weight of iso-octane. After the emulsion was formed, the emulsified mixture was passed through line 4 into solvent zone 5. Here the mixture was gently washed with a solvent which was Solvent 100 Neutral. The washing was done by mixing the mixture with the solvent at low mixing speed. A speed of 60 r.p.m. was employed. About 500 cc. of solvent were needed to wash the emulsion. The solvent was passed over the emulsion for a period of about 5 minutes. The compound which permeates more readily, iso-octane, was passed out of solvent zone 5 along with the solvent through line 7 and passed into fractionator 8. Here the solvent was separated and recycled through line 6. Product was obtained through line 11 which contained 35.6% by weight of octane and 64.4% by weight of iso-octane. The emulsion was removed through solvent zone 5 through line 10. The emulsion was rich in the less readily permeating compound which was octane. The emulsion was then passed into electrostatic coalescer zone 11 and the emulsion was broken. Surfactant was removed through line 13 and recycled back into emulsion zone 1. Product was removed through line 12. This product contained 52.5% octane and 47.5% iso-octane.

Example 6

In this example a process sequence similar to that of the figure was utilized. A mixture of octane and octene was introduced into emulsification zone 1 through line 2. A surfactant which was sodium dodecyl sulphate was introduced into zone 1 through line 3. About 250 gm. of mixture were used and about 270 cc. of 0.5% by weight of mixture of surfactant was added through line 3. The surfactant and hydrocarbon mixture were emulsified by means of stirring. Hydrocarbon mixture was placed in the emulsifier first, then the stirrer was turned on with a speed of 300 r.p.m. The aqueous solution of surfactant was sent into the emulsifier. As a result droplets of 0.01 cm. and smaller diameter were formed coated with surfactant. Temperature for this mixing operation was 80° F. and pressure was 1 atm. The mixture originally comprised a ratio of 49.9% by weight of octane and 50.1% by weight of octene. After the emulsion was formed, the emulsified mixture was passed through line 4 into solvent zone 5. Here the mixture was gently washed with a solvent which was Solvent 100 Neutral. The washing was done by mixing the mixture with the solvent at low mixing speed. A speed of 60 r.p.m. was employed. About 840 cc. of solvent were needed to wash the emulsion. The solvent was passed over the emulsion for a period of about 5 minutes. The compound which permeates more readily, octene, was passed out of solvent zone 5 along with the solvent through line 7 and passed into fractionator 8. Here the solvent was separated and recycled through line 6. Product was obtained through line 9 which contained 41.1% by weight of octane, and 58.9% by weight of octene. The emulsion was removed through solvent zone 5 through line 10. The emulsion was rich in the less readily permeating compound which was octane. The emulsion was then passed into electrostatic coalescer zone 11 and the emulsion was broken. Surfactant was removed through line 13 and recycled back into emulsion zone 1. Product was removed through line 12. This product contained 54.7% of octane and 45.3% of octene.

Example 7

In this example a process sequence similar to that of the figure was utilized. Steam-cracked naphtha was introduced into emulsification zone 1 through line 2. A surfactant which was saponin was introduced into zone 1 through line 3. About 300 gm. of the steam-cracked naphtha were used and about 400 cc. of 0.5% by weight of mixture of surfactant was added through line 3. The surfactant and hydrocarbon mixture were emulsified by means of stirring. Hydrocarbon mixture was placed in the emulsifier first, then the stirrer was turned on with a speed of 300 r.p.m. The aqueous solution of surfactant was sent into the emulsifier. As a result droplets of 0.01 cm. and smaller diameter were formed coated with surfactant. Temperature for this mixing operation was 80° F. and pressure was 1 atm. The naphtha feed contained 4.11 gm. of isopentadiene, 4.29 gm. of methyl cyclopentadiene, 13.25 gm. of benzene, 16.88 gm. of toluene and many high-boiling compounds. After the emulsion was formed, the emulsified mixture was passed through line 4 into solvent zone 5. Here the mixture was gently washed with a solvent which was Solvent 100 Neutral. The washing was done by mixing the mixture with the solvent at low mixing speed. A speed of 60 r.p.m. was employed. About 500 cc. of solvent were needed to wash the emulsion. The solvent was passed over the emulsion for a period of about 5 minutes. The compounds which permeate more readily, diolefins, were passed out of solvent zone 5 along with the solvent through line 7 and passed into fractionator 8. Here the solvent was separated and recycled through line 6. Product was obtained through line 9 which contained 3.65 gm. of isopentadiene, 3.72 gm. of methyl cyclopentadiene, 7.00 gm. of benzene and 8.56 gm. of toluene. The emulsion was removed through solvent zone 5 through line 10. The emulsion was rich in the less readily permeating compounds which were aromatics. The emulsion was then passed into electrostatic coalescer zone 11 and the emulsion was broken. Surfactant was removed through line 13 and recycled back into emulsion zone 1. Product was removed through line 12. This product contained 1.46 gm. of isopentadiene, 0.567 gm. of methyl cyclopentadiene, 6.25 gm. of benzene and 8.32 gm. of toluene. These data show that the percents of original diffused through the membrane for isopentadiene, methyl cyclopentadiene, benzene and toluene are 89.0%, 86.8%, 52.8% and 50.7%, respectively. An enrichment of diolefins in the solvent and an enrichment of high-boiling compounds in the raffinate are thus obtained.

Athough this invention has been described with some degree of particularity, it is intended only to be limited by the attached claims.

What is claimed is:

1. A process for separating components of a mixture of hydrocarbons having similar chemical or physical properties which comprises emulsifying a hydrocarbon mixture wherein individual emulsified droplets are formed, coating said droplets with a liquid surfactant membrane, said membrane selectively permeating at least one component of said mixture more rapidly than at least one other component and washing said coated droplets with an added solvent whereby at least a portion of said more permeable component is dissolved in said solvent.

2. The process of claim 1 wherein said mixture comprises normal paraffins and isoparaffins.

3. The process of claim 1 wherein said mixture comprises diolefins as the more permeable hydrocarbon and an aromatic as the less permeable hydrocarbon.

4. The process of claim 1 wherein said surfactant is selected from the group consisting of anionic and cationic surfactants.

5. The process of claim 1 wherein said surfactant is an nonylphenoxypolyethyleneoxy ethanol.

6. The process of claim 1 wherein said surfactant is saponin.

7. The process of claim 1 wherein said solvent is separated from said portion of said more permeable component.

8. The process of claim 1 wherein hydrocarbon mixture rich in said less permeable component is separated after said emulsion is broken.

9. The process of claim 8 wherein said surfactant is an alkyl benzene sulfonate.

10. The process of claim 1 wherein said hydrocarbon droplets are $1 \times 10^{-7}$ cm. to $1 \times 10^{-2}$ cm. in size.

11. A process for separating mixtures of hydrocarbons by selective permeation through a liquid membrane comprising the steps:

(1) forming an emulsion of said mixture in an aqueous medium, (2) coating the droplets of hydrocarbon mixture with a liquid surfactant membrane, said surfactant membrane being characterized by its ability to permeate at least one component of the said mixture more rapidly than at least one other component of said mixture, (3) washing said coated droplets with an added solvent, whereby at least a portion of the more permeable component is dissolved in said solvent, (4) separating said more permeable component from the said solvent, (5) separating the less permeable component by breaking the said emulsion.

12. The process of claim 11 wherein steps (1) and (2) are accomplished simultaneously by feeding the said hydrocarbon mixture and an aqueous surfactant solution to an emulsification stage.

13. The process of claim 11 wherein the surfactant is present in an amount sufficient to provide from about $10^{-4}$ to $10^{-1}$ mols of surfactant per liter of water in the aqueous medium.

References Cited

UNITED STATES PATENTS

| | | | |
|---|---|---|---|
| 1,520,953 | 12/1944 | Johansen | 208—308 |
| 3,168,585 | 2/1965 | McCarthy | 210—21 |

DELBERT E. GANTZ, *Primary Examiner.*

H. LEVINE, *Assistant Examiner.*